United States Patent Office 3,350,403
Patented Oct. 31, 1967

3,350,403
N-PHENYL AMIDES OF 4-PHENYL-4-HYDROXY-PIPERIDINO ALKYL ACIDS
John H. Biel and Harvey B. Hopps, Milwaukee, Wis., assignors to Aldrich Chemical Company, Inc., Milwaukee, Wis., a corporation of Wisconsin
No Drawing. Filed Apr. 7, 1964, Ser. No. 358,055
3 Claims. (Cl. 260—294)

This invention relates to novel 4-arylpiperidines. More particularly, this invention relates to N-phenyl amides of 4-phenylpiperidino alkanoic acids and a process for the preparation thereof. In a further aspect, this invention relates to novel intermediates useful in processes for preparing the novel 4-arylpiperidines of this invention.

In accordance with the present invention, there is provided a member selected from the group consisting of 4-arylpiperidines of the formula (I)
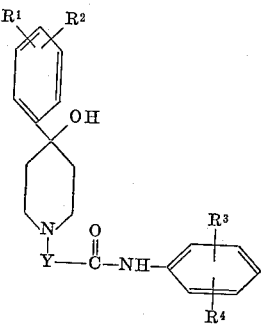

wherein $R^1$ and $R^2$ are each a member selected from the group consisting of hydrogen, chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive and cycloalkoxy radicals having from 5 to 7 carbon atoms inclusive, $R^3$ and $R^4$ are each (lower)alkyl, Y is a (lower)alkylene radical;

and the pharmaceutically acceptable nontoxic salts thereof.

Among the radicals represented by $R^1$ and $R^2$, hydrogen, chloro, bromo, iodo, fluoro, trifluoromethyl, nitro, (lower)alkyl, (lower)alkoxy, (lower)alkylthio, (lower)alkanoyl, phenyl, phenoxy and benzyl are preferred. Preferably, $R^1$ or $R^2$ is hydrogen, or both $R^1$ and $R^2$ are hydrogen.

The pharmaceutically acceptable nontoxic salts include the organic and inorganic acid addition salts, e.g., those prepared from acids such as hydrochloric, sulfuric, sulfamic, tartaric, hydrobromic, hydriodic, glycolic, citric, maleic, phosphoric, succinic, acetic and the like.

The term "(lower)alkyl" as used herein means both straight and branched chain aliphatic hydrocarbon radicals having from 1 to 8 carbon atoms such as methyl, ethyl, propyl, isopropyl, butyl, isobutyl, t-butyl, amyl, hexyl, 2-ethylhexyl, etc.

Similarly, where the term "(lower)" is used as part of the description of another group, e.g. "(lower)alkoxy," it refers to the alkyl portion of such group which is therefore as described in connection with "(lower)alkyl."

The meaning of the term "(lower)alkylene" is similar to that of "(lower)alkyl" in that it also means both straight and branched chain aliphatic hydrocarbon radicals having from 1 to 8 carbon atoms. Examples of "(lower)alkylene" radicals are methylene, ethylene, propylene, isopropylene, butylene, isobutylene, t-butylene, amylene, hexylene, 2-ethylhexylene and the like.

The compounds of this invention are valuable pharmaceutical agents. They exhibit antiarrhythmic activity which makes the compounds useful for the treatment of arrhythmia. In addition, the compounds, being tertiary bases, can be used to recover and purify penicillin with which they form salts.

Tests of the compounds of the present invention for antiarrhythmic activity were carried out by administering the compounds at dosages of 10 mgm./kg. intraperitoneally in experimental animals in which electrically induced ventricular fibrillation could be induced. Prevention of the ventricular fibrillation by a test compound, for example, N - (2,6-dimethylphenyl)-β-(4-hydroxy-4-phenylpiperidino)propionamide hydrochloride, indicates that the compound is an antiarrhythmic agent.

The compounds of the present invention are prepared by the following series of steps:

(1) A phenylamine of the formula

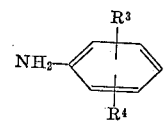

wherein $R^3$ and $R^4$ are as represented above, is reacted with an equimolar quantity of a halo or tosyl acid chloride of the formula

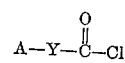

wherein A is a radical selected from the group consisting of chloro, bromo, iodo or tosyl and Y is as represented above according to the method described in U.S. Patent No. 2,569,288,

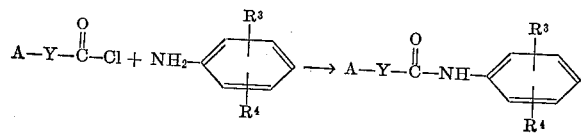

wherein A, Y, $R^3$ and $R^4$ are as previously defined. The product, an N-phenyl halo- or tosylalkanoic acid amide, is a novel intermediate, useful in the second step of the method for the preparation of the 4-arylpiperidines of Formula I, and is considered within the scope of this invention.

(2) The N-phenyl halo- or tosylalkanoic acid amide prepared in Step 1 is then reacted with an equimolar quantity of a piperidine of the formula

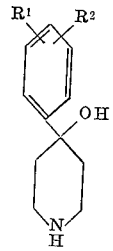

wherein $R^1$ and $R^2$ are as described above, in the presence of triethylamine and dimethylformamide and a trace of potassium iodide at elevated temperature, i.e., 65–70° C., for several hours according to the procedure described in U.S. Patent No. 2,937,180. The cooled reaction mixture is then poured into water containing an equimolar amount of sodium hydroxide. The free base is collected by filtration and dried.

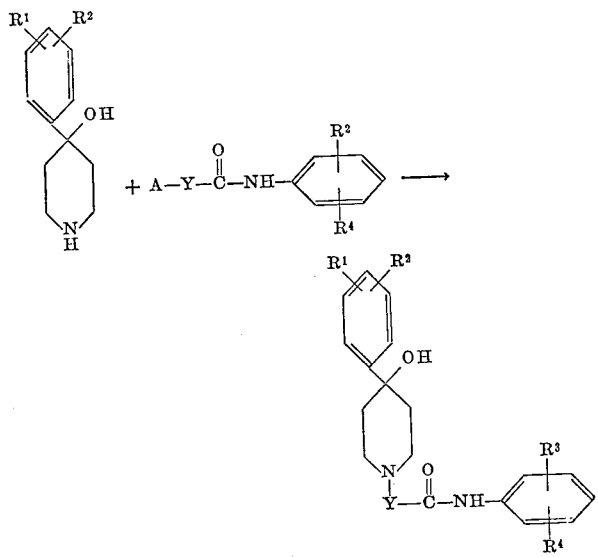

wherein A, $R^1$, $R^2$, $R^3$, $R^4$ and Y are as defined above.

The free base may be readily converted, if desired, to a nontoxic acid addition salt by conventional procedures.

An alternate procedure for preparing the compounds of the invention comprises the addition of the secondary piperidine to an acrylic acid amide or a substituted acid amide in the presence of a strong base, e.g. sodium hydroxide, according to the equation

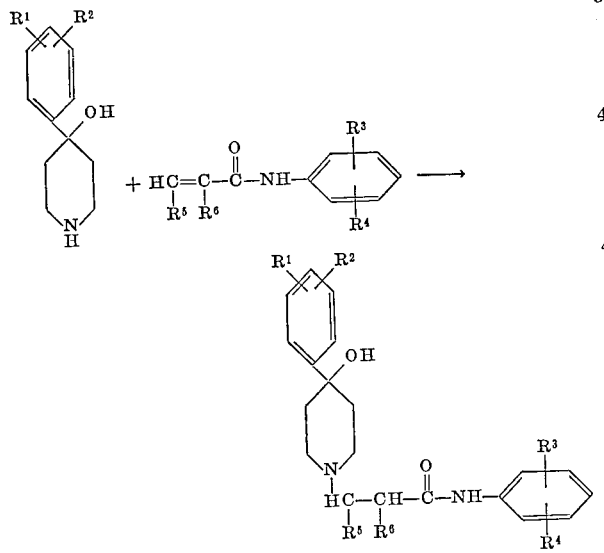

wherein $R^1$, $R^2$, $R^3$ and $R^4$ are as represented above, and $R^5$ and $R^6$ are each hydrogen or (lower)alkyl.

A third procedure by which the compounds can be prepared involves the reaction of a halo- or tosylalkanoic acid ester with the secondary piperidine and subsequent conversion to the amide

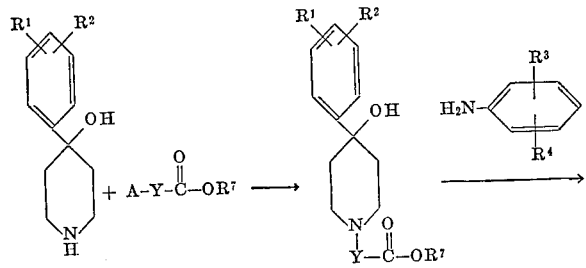

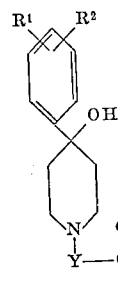

wherein A, $R^1$, $R^2$, $R^3$, $R^4$ and Y are as described above and $R^7$ is methyl, ethyl, p-nitrophenyl, cyanomethyl, succinimido, phthalimido, and $OR^7$ may also be chloro or bromo.

In each of the three methods for the preparation of the compounds of this invention, the secondary piperidine and other reactants are brought together in a suitable medium such as dimethylformamide, ethanol, isopropyl alcohol, toluene, xylene, dimethoxyethane, diethyleneglycol and heated at 50–100° C. for several hours in the presence of a base such as triethylamine, aminopyrine, diethylaniline, potassium carbonate, and triethyl phenyl ammonium hydroxide. The cooled reaction mixture is then poured into dilute sodium hydroxide. The basic amide or ester precipitates either as a water-insoluble oil or a crystalline solid and is extracted with such solvents as methylene dichloride, chloroform, carbon tetrachloride or by filtration of the solid product. In the case of the third process, the ester that is obtained is reacted with the appropriate phenylamine or substituted phenylamine; the product is then converted to a nontoxic acid addition salt.

It is obvious that in some cases, the radicals attached to the aromatic ring, e.g., the amino radical, will interfere with the reactions used in preparing the compounds of this invention. Therefore, it is necessary to block the reactive radicals before proceeding with the reactions. This is conveniently accomplished by methods known in the art. For example, in the case of an amino substituted aromatic ring, the amino group is blocked by forming the Schiffs' base by reacting the aromatic amine with an aldehyde such as acetaldehyde, and after all reactions have been completed, the Schiffs' base may be cleaved with dilute hydrochloric acid to regenerate the free amino group.

The starting materials necessary for the processes described herein are compounds which are either commercially available, well-known in the prior art, or easily prepared in accordance with standard organic procedures previously described in the chemical literature.

The compounds of this invention may be administered as the free bases or in the form of their nontoxic addition salts. They may be compounded and formulated into pharmaceutical preparations for oral or parenteral administration with organic or inorganic solid materials or liquids which are pharmaceutically acceptable carriers. The compositions may take the form of tablets, powder, granules, capsules, suspensions, solutions and the like. Such compositions are considered within the scope of this invention.

The following examples are intended to illustrate the invention described herein without unduly restricting it.

EXAMPLE 1

*Preparation of N-(2,6-dimethylphenyl)-β-chloropropionamide*

To a stirred solution of β-chloropropionyl chloride (105 gm.; 0.826 mole) and 1.0 liter of benzene cooled to 5° C. is added a solution containing 2,6-dimethylphenylamine (100 gm.; 0.826 mole) and triethylamine (83.5 gm.; 0.826 mole) during a period of two hours. The reaction mixture is clarified by filtration, washed with dilute sodium hydroxide followed by a dilute sulfuric acid wash and the benzene solution concentrated in vacuo. The residue crystallized on standing and the solid product is collected by filtration. The solid, N-(2,6-dimethyl)phenyl-β-chloropropionamide, is recrystallized from benzene-heptane and weighs 60 gm., has a melting point of 123–126° C. and has the following analysis:

Analysis calc'd for $C_{11}H_{14}ClNO$: C, 62.38%; H, 6.67%; N, 6.62%; Cl, 16.74%. Found: C, 62.94%; H, 6.53%; N, 6.76%; Cl, 16.04%.

EXAMPLE 2

In the procedure of Example 1, 2,6-dimethylphenylamine is replaced by 0.826 mole of 2,6-diethylphenylamine,
2,4-dimethylphenylamine,
3,4-dibutylphenylamine,
2,6-diisopropylphenylamine and
2,4-dihexylphenylamine, to produce
N-(2,6-diethylphenyl)-β-chloropropionamide,
N-(2,4-dimethylphenyl)-β-chloropropionamide,
N-(3,4-dibutylphenyl)-β-chloropropionamide,
N-(2,6-diisopropylphenyl)-β-chloropropionamide,
N-(2,4-dihexylphenyl)-β-chloropropionamide, respectively.

EXAMPLE 3

When, in the procedure of Example 1, the β-chloropropionyl chloride is replaced by 0.826 mole of Chloroacetyl chloride,
α-chloropropionyl chloride,
γ-chlorobutyryl chloride,
α-chloroisobutyryl chloride,
β-bromopropionyl chloride,
β-iodopropionyl chloride,
γ-chlorohexanoyl chloride and
β-tosylpropionyl chloride, respectively, the following compounds are produced, N-2,6-dimethylphenyl-chloroacetamide,
N-2,6-dimethylphenyl-α-chloropropionamide,
N-2,6-dimethylphenyl-γ-chlorobutyramide,
N-2,6-dimethylphenyl-α-chloroisobutyramide,
N-2,6-dimethylphenyl-β-bromopropionamide,
N-2,6-dimethylphenyl-β-iodopropionamide,
N-2,6-dimethylphenyl-γ-chlorohexanoamide and
N-2,6-dimethylphenyl-β-tosylpropionamide, respectively.

EXAMPLE 4

Preparation of N-2,6-dimethylphenyl-β-(4-phenyl-4-hydroxypiperidino)propionamide A mixture containing 4-phenyl-4-hydroxypiperidine (0.05 mole), N-2,6-dimethylphenyl-β-chloropropionamide (0.05 mole), triethylamine (0.06 mole) and dimethylformamide (30 ml.) is heated at 70° C. for four hours. The cooled reaction mixture is poured into about 300 ml. of water containing 0.05 mole of sodium hydroxide. The product, N-2,6-dimethylphenyl - β - (4-phenyl-4-hydroxypiperidino)propionamide, is separated as an oil which crystallizes upon standing. The compound has a melting point of 100–120° C.

EXAMPLE 5

Preparation of N-2,6-dimethylphenyl-β-(4-phenyl-4-hydroxypiperidino)propionamide hydrochloride The N - 2,6 - dimethylphenyl - β - (4-phenyl-4-hydroxypiperidino)propionamide prepared in Example 4 is dissolved in methylene chloride and converted to its hydrochloride salt by passing gaseous hydrogen chloride into the solution. The N-2,6-dimethylphenyl-β-(4-phenyl-4-hydroxypiperidino)propionamide hydrochloride precipitates out and is recrystallized from water and is found to have a melting point of 198–200° C. and the following analysis:

Analysis calc'd for $C_{22}H_{29}ClN_2O_2$: C, 67.94%; H, 7.51%; N, 7.20%; Cl, 9.11%. Found: C, 68.95%; H, 7.40%; N, 7.69%; Cl, 8.79%.

EXAMPLE 6

When, in the procedure of Example 4, the 4-phenyl-4-hydroxypiperidine is replaced by an equal molar amount of 4-3-fluorophenyl-4-hydroxypiperidine,
4-4-trifluoromethylphenyl-4-hydroxypiperidine,
4-2-bromophenyl-4-hydroxypiperidine,
4-3-chlorophenyl-4-hydroxypiperidine,
4-2-sulfamylphenyl-4-hydroxypiperidine,
4-3-hydroxyphenyl-4-hydroxypiperidine,
4-4-ethylphenyl-4-hydroxypiperidine,
4-3-methylphenyl-4-hydroxypiperidine,
4-2,4-dimethoxyphenyl-4-hydroxypiperidine,
4-3-methylthiophenyl-4-hydroxypiperidine,
4-2-aminophenyl-4-hydroxypiperidine,
4-4-chlorophenyl-4-hydroxypiperidine,
4-3-trifluoromethylphenyl-4-hydroxypiperidine,
4-3,4-methylenedioxyphenyl-4-hydroxypiperidine,
4-4-methoxyphenyl-4-hydroxypiperidine,
4-2-methylaminophenyl-4-hydroxypiperidine,
4-3-diethylaminophenyl-4-hydroxypiperidine,
4-2-acetylphenyl-4-hydroxypiperidine,
4-4-acetamidophenyl-4-hydroxypiperidine,
4-2-propylthiophenyl-4-hydroxypiperidine,
4-(2-hydroxy-4-nitrophenyl)-4-hydroxypiperidine,
4-4-phenylphenyl-4-hydroxypiperidine,
4-3-benzylphenyl-4-hydroxypiperidine,
4-3-phenoxyphenyl-4-hydroxypiperidine,
4-4-cyclohexylphenyl-4-hydroxypiperidine,
4-4-cycloheptyloxyphenyl-4-hydroxypiperidine,
4-2-iodophenyl-4-hydroxypiperidine,
4-2-methylthiophenyl-4-hydroxypiperidine, and
4-4-ethylsulfonylphenyl-4-hydroxypiperidine,
the following compounds are produced, N-2,6-dimethylphenyl-β-[4-(3-fluorophenyl)-4-hydroxypiperidino]propionamide,
N-2,6-dimethylphenyl-β-[4-(4-trifluoromethylphenyl)-4-hydroxypiperidino]propionamide,
N-2,6-dimethylphenyl-β-[4-(2-bromophenyl)-4-hydroxypiperidino]propionamide,
N-2,6-dimethylphenyl-β-[4-(3-chlorophenyl)-4-hydroxypiperidino]propionamide,
N-2,6-dimethylphenyl-β-[4-(2-sulfamylphenyl)-4-hydroxypiperidino]propionamide,
N-2,6-dimethylphenyl-β-[4-(3-hydroxyphenyl)-4-hydroxypiperidino]propionamide,
N-2,6-dimethylphenyl-β-[4-(4-ethylphenyl)-4-hydroxypiperidino]propionamide,
N-2,6-dimethylphenyl-β-[4-(3-methylphenyl)-4-hydroxypiperidino]propionamide,
N-2,6-dimethylphenyl-β-[4-(2,4-dimethoxyphenyl)-4-hydroxypiperidino]propionamide,
N-2,6-dimethylphenyl-β-[4-(3-methylthiophenyl)-4-hydroxypiperidino]propionamide,
N-2,6-dimethylphenyl-β-[4-(2-aminophenyl)-4-hydroxypiperidino]propionamide,
N-2,6-dimethylphenyl-β-[4-(4-chlorophenyl)-4-hydroxypiperidino]propionamide,
N-2,6-dimethylphenyl-β-[4-(3-trifluoromethylphenyl)-4-hydroxypiperidino]propionamide,
N-2,6-dimethylphenyl-β-[4-(3,4-methylenedioxyphenyl)-4-hydroxypiperidino]propionamide,
N-2,6-dimethylphenyl-β-[4-(4-methoxyphenyl)-4-hydroxypiperidino]propionamide,
N-2,6-dimethylphenyl-β-[4-(2-methylaminophenyl)-4-hydroxypiperidino]propionamide,
N-2,6-dimethylphenyl-β-[4-(3-diethylaminophenyl)-4-hydroxypiperidino]propionamide,
N-2,6-dimethylphenyl-β-[4-(2-acetylphenyl)-4-hydroxypiperidino]propionamide, N-2,6-dimethylphenyl-β-[4-(4-acetamidophenyl)-4-hydroxypiperidino]propionamide,
N-2,6-dimethylphenyl-β-[4-(2-propylthiophenyl)-4-hydroxypiperidino]propionamide,
N-2,6-dimethylphenyl-β-[4-(2-hydroxy-4-nitrophenyl)-4-hydroxypiperidino]propionamide,
N-2,6-dimethylphenyl-β-[4-(4-phenylphenyl)-4-hydroxypiperidino]propionamide,
N-2,6-dimethylphenyl-β-[4-(3-benzylphenyl)-4-hydroxypiperidino]propionamide,
N-2,6-dimethylphenyl-β-[4-(3-phenoxyphenyl)-4-hydroxypiperidino]propionamide,
N-2,6-dimethylphenyl-β-[4-(4-cyclohexylphenyl)-4-hydroxypiperidino]propionamide,
N-2,6-dimethylphenyl-β-[4-(4-cycloheptyloxyphenyl)-4-hydroxypiperidino]propionamide,
N-2,6-dimethylphenyl-β-[4-(2-iodophenyl)-4-hydroxypiperidino]propionamide,
N-2,6-dimethylphenyl-β-[4-(2-methylthiophenyl)-4-hydroxypiperidino]propionamide, and
N-2,6-dimethylphenyl-β-[4-(4-ethylsulfonylphenyl)-4-hydroxypiperidino] propionamide, respectively.

EXAMPLE 7

In the procedure of Example 4, N-2,6-dimethylphenyl-β-chloropropionamide is replaced by 0.05 mole of each of the aryl β-chloropropionamides prepared in Example 2 to produce the following products N-(2,6-diethylphenyl-β-(4-phenyl-4-hydroxypiperidino)-propionamide,
N-(2,4-dimethylphenyl)-β-(4-phenyl-4-hydroxypiperidino)propionamide,
N-(3,4-dibutylphenyl)-β-(4-phenyl-4-hydroxypiperidino)-propionamide,
N-(2,6-diisopropylphenyl)-β-(4-phenyl-4-hydroxypiperidino)propionamide, and
N-(2,4-dihexylphenyl)-β-(4-phenyl-4-hydroxypiperidino)-propionamide,

EXAMPLE 8

When, in the procedure of Example 4, N-2-phenylcyclopropyl-β-chloropropionamide is replaced by an equal molar amount of each of the N-benzyl-β-chloro and tosyl alkylamides prepared in Example 3, the following products are produced, N-(2,6-dimethylphenyl)-(4-phenyl-4-hydroxypiperidino)-acetamide,
N-(2,6-dimethylphenyl)-α-(4-phenyl-4-hydroxypiperidino)propionamide,
N-(2,6-dimethylphenyl)-γ-(4-phenyl-4-hydroxypiperidino)butyramide,
N-(2,6-dimethylphenyl)-β-(4-phenyl-4-hydroxypiperidino)propionamide,
N-(2,6-dimethylphenyl)-β-(4-phenyl-4-hydroxypiperidino)propionamide,
N-(2,6-dimethylphenyl)-γ-(4-phenyl-4-hydroxypiperidino)hexanoamide, and
N-(2,6-dimethylphenyl)-β-(4-phenyl-4-hydroxypiperidino)propionamide.

What is claimed is:
1. A compound of the formula

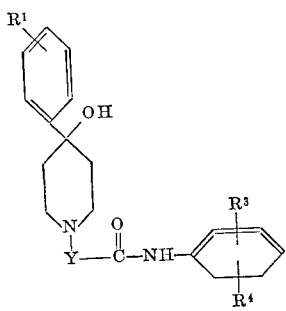

wherein $R^1$ is a member selected from the group consisting of chloro, bromo, iodo, fluoro, trifluoromethyl, amino, nitro, (lower)alkyl, (lower)alkoxy, hydroxy, phenyl, phenoxy, benzyl, (lower)alkylamino, di(lower)alkylamino, (lower)alkanoylamino, (lower)alkylthio, sulfamyl, (lower)alkanoyl, (lower)alkylsulfonyl, methylenedioxy, cycloalkyl radicals having from 5 to 7 carbon atoms inclusive, and cycloalkoxy radicals having from 5 to 7 carbon atoms inclusive,
$R^3$ and $R^4$ are each (lower)alkyl,
Y is a (lower)alkylene radical;
and the pharmaceutically acceptable nontoxic salts thereof.
2. A compound of claim 1 of the formula

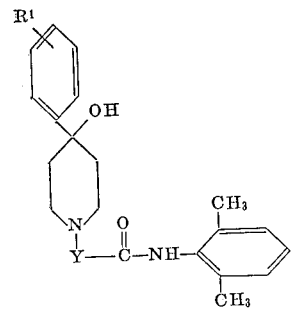

wherein $R^1$ is a member selected from the group consisting of chloro, bromo, iodo, fluoro, trifluoromethyl, nitro, (lower)alkyl, (lower)alkoxy, (lower)alkylthio, (lower)alkanoyl, phenyl, phenoxy and benzyl,
Y is a (lower)alkylene radical;
and the pharmaceutically acceptable nontoxic salts thereof.
3. A compound of the formula

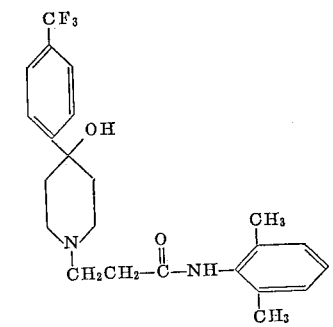

References Cited
UNITED STATES PATENTS
3,154,557  10/1964  Zenitz _____ 260—294

OTHER REFERENCES
Dahlbom et al.: Acta Chemica Scandinavica 17 (1963), 227–231.

WALTER A. MODANCE, *Primary Examiner.*
A. D. SPEVACK, *Assistant Examiner.*